United States Patent Office 3,377,248
Patented Apr. 9, 1968

3,377,248
METHODS AND COMPOSITIONS OF FERROCENE CYCLIC ETHERS IN THE TREATMENT OF IRON DEFICIENCY ANEMIA
Jerry E. Robertson, St. Paul, Minn., assignor to Colgate-Palmolive Company, New York, N.Y., a corporation of Delaware
No Drawing. Filed Oct. 7, 1965, Ser. No. 493,892
6 Claims. (Cl. 167—68)

ABSTRACT OF THE DISCLOSURE

The pharmaceutical compositions contain ferrocene cyclic ethers in combination with pharmaceutical diluents. The compositions are useful as orally effective agents in the treatment of iron deficiency anemia. A composition disclosed contains a safe and effective amount of 1,1'-diethyl-$\alpha,\alpha'$-epoxyferrocene in combination with a pharmaceutical diluent.

---

The present invention relates to ferrocene derivatives. More particularly, it relates to a method of treating iron deficiency anemia in animals by the administration of ferrocene cyclic ethers. Ferrocene is the commonly accepted name for dicyclopentadienyliron or biscyclopentadienyliron.

The ferrocene cyclic ethers contemplated for use in the inventive method may be represented by the following formula:

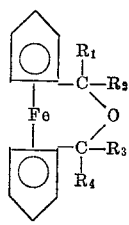

in which $R_1$, $R_2$, $R_3$ and $R_4$ are selected from hydrogen, a lower alkyl such as methyl, ethyl, isopropyl, butyl, pentyl and hexyl, an aryl such as phenyl, or a nuclear-substituted phenyl such as halogen substituted phenyl, an aralkyl such as benzyl, phenethyl, phenylisopropyl and diphenylmethyl, a cycloalkyl, particularly a cycloalkyl having from 3 to 7 carbon atoms such as cyclopropyl, cyclopentyl and cyclohexyl, and a cycloalkyl-lower alkyl such as cyclohexylmethyl or cyclopentylethyl.

The ferrocene cyclic ethers may be conviently prepared by treating an appropriate diol with acid in the presence of water. The process may be represented as follows:

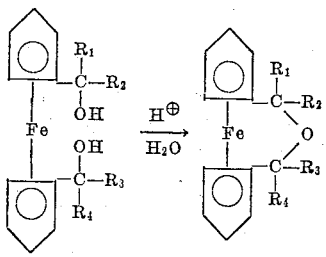

in which $R_1$, $R_2$, $R_3$ and $R_4$ are as previously described.

Preferably, the ferrocene cyclic ethers employed in the method of the present invention are prepared by adding sufficient glacial acetic acid to the diol to dissolve it, stirring the resulting solution at room temperature under a nitrogen atmosphere, and then adding water in small portions to form and precipitate the ether. The reaction mixture is then cooled and the cyclic ether separated by filtration or other conventional means. The diols which are not soluble in the acid may be dissolved initially in an organic solvent, such as benzene, and then treated with the acid and water substantially as described.

The compounds may also be prepared as described in the literature as, for example, by treating the corresponding diol with an acidic mixture, such as 2% acetic acid in a 1:1 ethanol water mixture. T. A. Mashburn, Jr., et al., J. Org. Chem., 26, 1671 (1961); K. L. Rinehart, Jr., et al., J. Amer. Chem. Soc., 82, 4111 (1960).

Representative of the cyclic ethers which may be prepared by the above processes are the following:

1,1'-dimethyl-$\alpha,\alpha'$-epoxyferrocene,
1,1'-diethyl-$\alpha,\alpha'$-epoxyferrocene,
1,1'-dibenzyl-$\alpha,\alpha'$-epoxyferrocene,
1,1'-dihexyl-$\alpha,\alpha'$-epoxyferrocene,
1-ethyl-1'-propyl-$\alpha,\alpha'$-epoxyferrocene,
1-benzyl-1'-ethyl-$\alpha,\alpha'$-epoxyferrocene,
1,1'-[($\alpha,\alpha'$-tetramethyl)dimethyleneepoxy]ferrocene,
1,1' - [($\alpha,\alpha'$ - dimethyl - $\alpha,\alpha'$ - diphenyl)dimethyleneoxy] ferrocene, and
1-($\alpha$-cyclohexylethyl) - 1' - ($\alpha$-phenylpropyl)-2,2'-epoxyferrocene.

The diols intended for use as starting materials may be prepared by treating the corresponding diacyl derivatives with a chemical agent such as lithium aluminum hydride, sodium borohydride, an alkyl or aryl lithium such as phenyl lithium or alkyl magnesium halides, or with hydrogen under superatmospheric pressure at temperatures below 75° C., in the presence of a hydrogenation catalyst such as a platinum or palladium catalyst. (U.S. Patent No. 2,810,737.)

The diols alternatively may be prepared by treating the diacetyl derivative with sodium hydroxide in the presence of chlorine to form the dicarboxylic acid, and then reducing the dicarboxylic acid either in the free acid form or in the form of a loweralkyl ester with a chemical reducing agent such as lithium aluminum hydride.

Illustrative of the diols which may be prepared by the described processes are the following:

1,1'-dihydroxymethylferrocene,
1,1'-di-$\alpha$-hydroxyethylferrocene,
1,1'-di-$\alpha$-hydroxybutylferrocene,
1,1'-di-$\alpha$-hydroxypentylferrocene,
1,1'-di-$\alpha$-hydroxybenzylferrocene,
1,1'-di-$\alpha$-hydroxyhexylferrocene,
1-($\alpha$-hydroxyethyl)-1'-($\alpha'$-hydroxypropyl)ferrocene,
1-($\alpha$-hydroxyethyl)-1'-($\alpha$-hydroxybenzyl)ferrocene,
1,1'-di($\alpha$-hydroxy-$\alpha$-methylbenzyl)ferrocene, and
bis(1-hydroxyisopropyl)ferrocene.

The symmetrical diacyl derivatives, those in which $R_1$ and $R_3$ are hydrogen and $R_2$ and $R_4$ are not hydrogen and are the same, may be prepared by treating ferrocene with an acid chloride, or an acid anhydride and aluminum chloride in the manner described by Woodward, Rosenblum and Whiting in J. Am. Chem. Soc., 74, 3458 (1952).

The diacyl derivatives in which $R_1$ and $R_3$ are hydrogen and $R_2$ and $R_4$ are not hydrogen and are not the same, may be prepared by treating ferrocene with an aliphatic acylating agent such as a carboxylic acid anhydride, at a temperature between 20° and 120° C., in the presence of a suitable Friedel Crafts catalyst such as $BF_3$-etherate, hydrogen fluoride, a metal chloride such as aluminum chloride or a polyphosphoric acid. (U.S. Patent No. 2,988,562.)

The monoacyl derivative thus obtained, is then treated with an acylating agent, such as an acid chloride which contains a different acyl group, in the presence of a Friedel Crafts condensing agent, such as described above. The resulting unsymmetrical diacyl compound may be converted to the corresponding unsymmetrical diols in the manner described for the symmetrical diols.

The unsymmetrical diol may then be treated with glacial acetic acid in the presence of water, as previously described, to form the cyclic ether.

Ferrocene, which is the starting material for the preparation of the acyl derivatives, is commercially available from several sources. However, if desired, it may be prepared in the laboratory by a variety of methods. One such method involves the reaction between cyclopentadiene and iron pentacarbonyl in the manner described in U.S. Patent No. 2,791,597. Another such method involves the Grignard reaction between a cyclopentadienyl magnesium halide and the anhydrous halide of iron dissolved in ether, as described in U.S. Patent No. 2,680,756. Still another method comprises treating an anhydrous halide of iron with cyclopentadienyl sodium in the manner described in U.S. Patent No. 3,092,647.

The ferrocene cyclic ethers are excellent hematinic agents useful in the treatment of iron deficiencies in animals, such as piglets. The cyclic ethers are more readily absorbed when administered orally than previously available hematinics and, in addition, are less toxic than ferrocene itself.

In the practice of the invention, the ferrocene cyclic ethers are combined with pharmaceutical diluents and formed into dosage forms suitable for administration, such as tablets, capsules, syrups, elixirs, solutions or the like. Although the oral route of administration is especially preferred the compounds can be administered parenterally, if desired.

Pharmaceutical carriers which are either liquid or solid may be employed. The preferred liquid carrier is water. However, suitable organic solvents such as propylene glycol may also be employed. Flavoring materials may be included if desired.

Solid pharmaceutical carriers such as starch, sugar and talc can be utilized to form powders. These powders can be used as such or can be tableted or used to fill gelatin capsules. Suitable lubricants such as magnesium stearate, binders such as gelatin, and disintegrating agents such as sodium carbonate in combination with citric acid may be employed in the formation of the tablets.

Unit dosage forms, such as tablets and capsules, may contain any suitable predetermined amount of one or more of the active ingredients and may be administered one or more at a time at regular intervals. Such unit dosage forms, however, should generally contain approximately 5 to 500 mg. of the ferrocene cyclic ether.

A typical tablet may have the following composition:

| | Mg. |
|---|---|
| Ferrocene cyclic ether | 250 |
| Polyvinylpyrrolidone (pharmaceutical grade) | 15 |
| Corn starch | 50 |
| Magnesium stearate | 3 |

The tablets are formed on a ⅜-inch deep cup punch and the tablets may be coated if desired.

A typical soft gelatin capsule, size 0, may have the following composition:

Ferrocene cyclic ether _____mg__ 250
Polyethylene glycol 400, 0.5 cc. (q.s. ad.)

A typical oil solution may contain the following ingredients in each teaspoonful:

Ferrocene cyclic ether _____mg__ 250
Preservatives and flavor _____ q.s.
Peanut oil, 5 ml. (q.s. ad.)

A typical aqueous suspension intended for oral administration may contain the following ingredients in each teaspoonful:

Ferrocene cyclic ether _____mg__ 250
Sorbitol _____cc__ 1,250
Sodium carboxymethyl cellulose _____mg__ 50
Cellulose (microcrystalline) _____mg__ 500
Preservatives and flavor _____ q.s.
Water, 5 cc. (q.s. ad.)

The exact quantity of the composition to be administered, of course, will depend upon many factors including the elemental iron content of the compound and the nature and extent of the iron deficiency of the patient. However, generally speaking, the amount administered in a single day will be equivalent to about 5 mg. to about 500 mg. of elemental iron.

The following examples illustrate the preparation of the cyclic ethers:

Example 1.—1,1'-diacetylferrocene

To a mixture of 159 g. (1.2 moles) of aluminum chloride in 600 ml. of methylene is added in portions 96 ml. (1.35 moles) of acetyl chloride over a 15-minute period. To the resulting mixture is added in portions with stirring a solution of 90 g. (0.486 mole) of ferrocene in 500 ml. of methylene chloride over a 25-minute period. The mixture is stirred at room temperature for two hours and poured over 3 liters of crushed ice.

The reaction mixture is filtered and the aqueous layer is extracted with three 500 ml. portions of chloroform. The combined organic layer is washed three times with water (800 ml.), dried over anhydrous sodium sulfate, filtered, and distilled under reduced pressure to yield a dark red residue. After one recrystallization from isopropyl alcohol 87.9 g. (67%) of 1,1'-diacetylferrocene, M.P. 126–127°, is obtained.

Analysis.—Calcd. for $C_{14}H_{14}FeO_2$: Fe, 20.67. Found: Fe, 20.35.

Example 2.—1,1'-di-α-hydroxyethylferrocene

A mixture of diacetylferrocene (27.0 g., 0.1 mole) and sodium borohydride (7.6 g., 0.2 mole) in 200 ml. of 2-propanol is refluxed under nitrogen for 5 hours. The solvent is removed under vacuum, and the residue is treated with 400 ml. of water. The crude product is taken up in ether, dried over anhydrous sodium sulfate and evaporated. The remaining amber oil is dissolved in hot n-hexane, the solution is filtered and cooled with scratching. The diol precipitates as yellow-orange needles, 23.6 g. (86.1%), M.P. 68–70°.

Analysis.—Calcd. for $C_{14}H_{18}O_2Fe$: Fe, 20.37. Found: Fe, 20.09.

Example 3.—1,1'-diethyl-α,α'-epoxyferrocene

A mixture of 50 g. (0.182 mole) of 1,1'-di-α-hydroxyethylferrocene in 400 ml. of 2% acetic acid in 1:1 ethanol-water is gently refluxed for 2 hours. The reaction mixture is poured into 400 ml. of ice water and extracted with three 400 ml. portions of ether. The ether extracts are combined and washed with three 150 ml. portions of saturated sodium bicarbonate solution. The ether is dried over anhydrous sodium sulfate and distilled in vacuo to obtain an amber oil.

The oil is dissolved in 70% boiling methanol solution, treated with activated charcoal, filtered, and cooled to give 1,1'-diethyl-α,α'-epoxyferrocene in the form of yellow needles, M.P. 101–102°.

Analysis.—Calcd. for $C_{14}H_{16}FeO$: C, 65.52; H, 6.25. Found: C, 65.31; H, 6.58.

Example 4.—1,1'-dibenzoylferrocene

To a mixture of 361 g. (2.7 mole) of aluminum chloride in 1200 ml. of dichloromethane is added 432 g. (3.1 mole) of benzoyl chloride over a period of 40 minutes after which a solution containing 205 g. (1.1 mole) of ferrocene dissolved in 1200 ml. of dichloromethane is added over a period of 80 minutes. The mixture is stirred at room temperature for 2 hours and poured onto 8 liters of crushed ice. The aqueous layer is separated and washed twice with 300 ml. portion of dichloromethane. The combined organic solution is washed twice with 1 liter portions of 10% sodium hydroxide solution, once with 1 liter of water, dried over sodium sulfate, and concentrated in vacuo to yield a red syrup which is crystallized from ethanol to yield 1,1'-dibenzoylferrocene in the form of a dark red crystalline solid, M.P. 100–103°.

*Analysis.*—Calcd. for $C_{24}H_{18}FeO_2$: Fe, 14.17. Found: Fe, 13.97.

Example 5.—1,1'-di-α-hydroxybenzylferrocene

To a mixture of 7.6 g. (0.2 mole) of sodium borohydride in 500 ml. of isopropanol there is added in portions 30 g. (0.0777 mole) of 1,1'-dibenzoylferrocene with cooling and stirring. The reaction mixture is stirred at room temperature for two hours and then allowed to reflux for five hours.

The reaction mixture is cooled and distilled under diminished pressure to remove the solvent and the residue is dissolved in 750 ml. of water. The solid product is filtered and recrystallized from dilute isopropanol to give 1,1'-di-α-hydroxybenzylferrocene, M.P. 132°, light brown plates.

*Analysis.*—Calcd. for $C_{24}H_{22}FeO_2$: Fe, 14.02. Found: Fe, 13.95.

Example 6.—1,1'-dibenzyl-α,α'-epoxyferrocene

Three grams (0.00755 mole) of 1,1'-di-α-hydroxybenzylferrocene is dissolved in 175 ml. of glacial acetic acid and the solution is stirred at room temperature for 24 hours under nitrogen atmosphere.

To the reaction mixture is added in portions 150 ml. of water while stirring and the resulting yellow solid product is filtered and dried to give 1,1'-dibenzyl-α,α'-epoxyferrocene, M.P. 172–185°.

*Analysis.*—Calcd. for $C_{24}H_{20}FeO$: Fe, 14.69. Found: Fe, 14.82.

Example 7.—1,1'-dihexanoylferrocene

To a mixture of 164 g. (1.24 mole) of aluminum chloride in 550 ml. of dichloromethane is added 187 g. (1.39 mole) of hexanoyl chloride in portions over a 15 minute period, then a filtered solution of 93 g. (0.5 mole) of ferrocene in 600 ml. of dichloromethane is added in portions over a 40-minute period. The mixture is stirred at room temperature for 2 hours and poured onto 3 liters of crushed ice. The aqueous layer is separated and extracted once with 300 ml. of dichloromethane. The combined organic solution is washed once with 1 liter of water, once with 1 liter of 10% sodium hydroxide, and once with 500 ml. of brine after which it is dried and concentrated. The dark red oily residue is crystallized from n-hexane to yield 1,1'-dihexanoylferrocene in the form of rust red needles, M.P. 43–45°.

*Analysis.*—Calcd. for $C_{22}H_{30}FeO_2$: C, 69.13; H, 7.90; Fe, 14.61. Found: C, 69.16; H, 7.95; Fe, 14.57.

Example 8.—1,1'-di-α-hydroxyhexylferrocene

To a mixture of 8 g. (0.21 mole) of sodium borohydride in 500 ml. of isopropanol is added 38.2 g. (0.1 mole) of 1,1'-dihexanoylferrocene in one portion after which the mixture is gently refluxed for 6 hours. It is then cooled and dissolved in a mixture of 600 ml. of water and 500 ml. of ether. The aqueous layer is separated and extracted once with 100 ml. of ether. The combined organic solution is washed with 300 ml. of brine, dried, and concentrated in vacuo to yield a yellow oil which is crystallized from aqueous isopropanol to yield a yellow light textured solid, M.P. 45–49°. A 5.0 g. sample is recrystallized again from aqueous isopropanol to yield 1,1'-di-α-hydroxyhexylferrocene, M.P. 58.5–60°.

*Analysis.*—Calcd. for $C_{22}H_{34}FeO_2$: C, 68.46; H, 8.87; Fe, 14.45. Found: C, 68.39; H, 9.07; Fe, 14.45.

Example 9.—1,1'-dihexyl-α,α'-epoxyferrocene

To 100 ml. of glacial acetic acid is added 10.0 g. (0.026 mole) of 1,1'-di-α-hydroxyhexylferrocene in portions over a 5 minute period. The solution is stirred at room temperature for 5.5 hours. To the mixture is added 100 ml. of water in 0.5 hour, and an additional 200 ml. of water is added in one portion. The mixture is extracted twice with 100 ml. portions of benzene. The combined extracts are washed twice with 150 ml. portions of saturated sodium bicarbonate solution and once with 150 ml. of brine, after which they are dried and concentrated to yield a dark oil. This is chromatographed through aluminum oxide (75 g., 2 x .35 cm.) using 100 ml. of n-hexane as an eluent to yield 1,1'-dihexyl-α,α'-epoxyferrocene in the form of a clear dark-gold oil.

*Analysis.*—Calcd. for $C_{22}H_{32}FeO$: C, 71.74; H, 8.76; Fe, 15.16. Found: C, 71.87; H, 8.90; Fe, 14.90.

Example 10.—1-acetyl-1'-propionylferrocene

To a dispersion of 20.3 g. (0.15 mole) of aluminum chloride in 200 ml. of dichloromethane is added dropwise a solution of 13.9 g. (0.06 mole) 1-acetylferrocene in 125 ml. of dichloromethane. The mixture is heated to reflux and 6.1 g. (0.07 mole) of propionyl chloride in 100 ml. dichloromethane is added in 25 minutes after which it is refluxed for an additional 35 minutes. The mixture is poured into 1 liter of ice water and extracted with chloroform. The extract is washed with 10% hydroxide solution, brine, and concentrated to yield a dark oil which is chromatographed through activated alumina using ether as an eluent to yield a semi-solid which is crystallized. It is recrystallized from ether and cooled in a Dry Ice/acetone bath to yield an orange solid, 1-acetyl-1'-propionylferrocene, M.P. 58.5–59°.

*Analysis.*—Calcd. for $C_{15}H_{16}FeO_2$: C, 63.41; H, 5.68. Found: C, 63.42; H, 5.53.

Example 11.—1-(α-hydroxyethyl)-1'-(α'-hydroxypropyl)ferrocene

A mixture of 13.8 g. (0.049 mole) of 1-acetyl-1'-propionyl-ferrocene and 4.0 g. (0.16 mole) of sodium borohydride in 225 ml. of isopropanol is refluxed for 4.5 hours. The mixture is concentrated and 50 ml. of brine and 150 ml. of ether are added. The mixture is then stirred for 10 minutes. The ether solution is separated, washed with brine, dried, and concentrated. The residue is taken up in 150 ml. of benzene, treated with activated charcoal, and concentrated to yield a yellow oil which is dried at 70°/4.0 mm. to yield 1-(α-hydroxyethyl)-1'-(α'-hydroxypropyl)ferrocene, B.P. 140°/0.05 mm.

*Analysis.*—Calcd. for $C_{15}H_{20}FeO_2$: C, 62.51; H, 7.00; Fe, 19.39. Found: C, 62.69; H, 7.25; Fe, 19.35.

Example 12.—1-ethyl-1'-propyl-α,α'-epoxyferrocene

Three grams (0.0104 mole) of 1-(α-hydroxyethyl)-1'-(α'-hydroxypropyl)ferrocene is dissolved in 100 ml. of glacial acetic acid and the solution allowed to stand at room temperature with stirring for 40 minutes.

To the reaction mixture is added dropwise 250 ml. of water and the reaction mixture is stirred at room temperature for 1 hour. The semi-solid product is separated by decantation and recrystallized twice by dissolving the product in 50 ml. of methanol and adding the filtrate (methanol) to 200 ml. of water. After drying 1-ethyl-1'-propyl-α,α'-epoxyferrocene is obtained in the form of yellow plates, M.P. 66–70°.

*Analysis.*—Calcd. for $C_{15}H_{18}FeO$: C, 66.69; H, 6.71. Found: C, 66.68; H, 6.53.

Example 13.—1-acetyl-1'-benzoylferrocene

To a dispersion of 21.6 g. (0.162 mole) of aluminum chloride in 200 ml. of dichloromethane is added 9.8 g. (0.07 mole) of benzoyl chloride, dissolved in 30 ml. dichloromethane in 15 minutes. A solution of 14.8 g. (0.065 mole) of 1-acetylferrocene in 150 ml. dichloromethane is then added in portions over a 20 minute period after which the mixture is stirred for 2 hours at room temperature and then poured into 1 liter of ice water. The organic layer is separated, and the aqueous layer extracted twice with chloroform. The organic solutions are combined and washed twice with 200 ml. portions of 10% sodium hydroxide, once with brine, dried, and concentrated to yield a red oil. It is chromatographed through activated aluminum. n-Hexane (2.5 liters) is passed through the column to yield a yellow solid which is recrystallized from n-hexane to yield 2.3 g. of 1-acetylferrocene. A 50% solution of n-hexane and ether (800 ml.) is then passed through the column to yield a red oil which is crystallized from 100 ml. of ether, cooled in a salted ice bath to give 1-acetyl-1'-benzoylferrocene in the form of a bright red powder, M.P. 69–70°.

*Analysis.*—Calcd. for $C_{19}H_{16}FeO$: C, 68.71; H, 4.85. Found: C, 68.85; H, 5.01.

Example 14.—1-(α-hydroxyethyl)-1'-(α'-hydroxybenzyl)ferrocene

A mixture of 4.4 g. (0.013 mole) of 1-acetyl-1'-benzoylferrocene and 1.06 g. (0.028 mole) of sodium borohydride in 65 ml. of isopropanol is gently refluxed for 4.5 hours after which it is concentrated in vacuo to yield a yellow residue which is stirred in a mixture of 100 ml. of ether and 50 ml. of brine for 0.5 hour. The aqueous layer is separated and extracted twice with ether. The organic solutions are combined, washed with brine, dried, and concentrated to yield a solid which is recrystallized from ethanol to yield 1-(α-hydroxyethyl)-1'-(α'-hydroxybenzyl)ferrocene in the form of a yellow crystalline powder, M.P. 122–123.5°.

*Analysis.*—Calcd. for $C_{19}H_{20}FeO_2$: C, 67.87; H, 6.00. Found: C, 67.89; H, 6.20.

Example 15.—1-ethyl-1'-benzyl-α,α'-epoxyferrocene

1 - (α-hydroxyethyl)-1' - (α'-hydroxybenzyl)ferrocene (1.5 g., 0.00445 mole) is dissolved in 75 ml. of glacial acetic acid and the solution is allowed to stand at room temperature with stirring for 30 minutes.

To the solution is added in portions 300 ml. of water and the mixture is stirred at 0° to 10° C. for 20 minutes. The reaction mixture is filtered and the residue washed with water. After drying there is obtained 1-ethyl-1'-benzyl-α,α'-epoxyferrocene in the form of yellow plates, M.P. 103–106°.

*Analysis.*—Calcd. for $C_{19}H_{18}FeO$: C, 71.71; H, 5.71. Found: C, 71.73; H, 5.99.

Example 16.—Bis(1-hydroxyisopropyl)ferrocene

To a Grignard reagent prepared from 3.7 g. (0.15 mole) of magnesium and 42.4 g. (0.30 mole) of methyl iodide in 250 ml. of ether is added a solution of 10 g. (0.037 mole) of 1,1'-diacethylferrocene in 200 ml. of benzene in 45 minutes. The mixture is refluxed for 1¾ hours and stirred at room temperature for 16 hours. The complex is decomposed by the addition of 50 ml. of saturated ammonium chloride. The organic layer is separated, washed with 50 ml. of brine, dried and concentrated to yield an oil which is chromatographed through silica gel (190 g., 3 x 52 cm.) using 1.6 liters of a solution of varying proportions of ether and n-hexane to yield 4.6 g. of a crude material which is rechromatographed through silica gel (80 g., 3 x 25 cm.) in the same manner to yield bis (1-hydroxyisopropyl)ferrocene as a yellow-orange semisolid.

Example 17.—1.1'-[(α,α'-tetramethyl)dimethyleneepoxy]ferrocene

To 75 ml. of glacial acetic acid is added 2.1 g. (0.07 mole) of bis(1-hydroxyisopropyl)ferrocene, the mixture is stirred under nitrogen for 20 minutes at room temperature at 60° for 10 minutes, and again at room temperature for 1 hour. The mixture is diluted with 350 ml. of brine, and extracted three times with 75 ml. portions of benzene. The combined extracts are washed with brine, dried and concentrated to yield an orange oil which is chromatographed through silica gel (50 g.) using 650 ml. of varying proportions of benzene and n-hexane to yield a yellow solid which is recrystallized from n-hexane, cooled in a Dry Ice/acetone bath to yield 1,1'-[(α,α'-tetramethyl)dimethyleneepoxy]ferrocene in the form of a yellow powder, M.P. 120–121°.

Example 18.—1,1'-di(α-hydroxy-α-methylbenzyl) ferrocene

To a solution of 60 ml. (0.12 mole) of phenyllithium in benzene-ether is added dropwise under nitrogen 10 g. (0.037 mole) of diacetylferrocene in 450 ml. of benzene. The reaction mixture is stirred at room temperature for 3 hours and then allowed to reflux for 30 minutes under nitrogen.

After cooling, 15 ml. of saturated ammonium chloride solution is added dropwise to the mixture and it is stirred for 15 minutes. The solvent is distilled under diminished pressure to yield 16 g. of a dark semisolid.

The dark residue is dissolved in 200 ml. of n-hexane benzene (3:1) and the solution cooled using Dry Ice bath to give the crude diol, M.P. 124–126°, yellow solids.

The filtrate is distilled under diminished pressure and the residue triturated using ethanol to give 1,1'-di(α-hydroxy-α-methylbenzyl)ferrocene, M.P. 140–142°, yellow plates.

*Analysis.*—Calcd. for $C_{26}H_{26}FeO_2$: Fe, 13,20. Found: Fe, 13.30.

Example 19.—1,1'-[(α,α'-dimethyl-α,α'-diphenyl) dimethyleneoxy]ferrocene

The procedure of Example 17 is repeated using 1,1-di(α-hydroxy-α-methylbenzyl)ferrocene as the diol. The compound 1,1'-[(α,α' - dimethyl-α,α'-diphenyl)dimethyleneoxy]ferrocene is obtained.

It will be readily apparent to those skilled in the art that the ferrocene cyclic ethers may exist in different stereo-chemical forms.

I claim:

1. The method of treating iron deficiency anemia in an animal which comprises administering to said animal a safe and effective amount of a compound of the formula

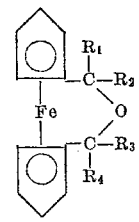

wherein $R_1$, $R_2$, $R_3$ and $R_4$ are selected from hydrogen, lower alkyl, aralkyl selected from benzyl, phenethyl, phenylisopropyl and diphenylmethyl, aryl, cycloalkyl of 3 to 7 carbon atoms cyclohexyl-methyl and cyclopentyl ethyl.

2. The method of treating iron deficiency anemia in an animal which comprises administering to said animal a safe and effective amount of 1,1'-di-lower alkyl-α,α'-epoxyferrocene.

3. The method of treating iron deficiency anemia in an animal which comprises administering to said animal a safe and effective amount of 1,1'-diethyl-α,α'-epoxyferrocene.

4. The method of treating iron deficiency anemia in an animal which comprises administering to said animal about 5 mg. to about 500 mg. of elemental iron in the form of a compound of the formula

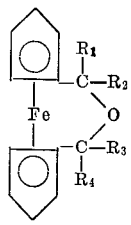

in which $R_1$, $R_2$, $R_3$ and $R_4$ are hydrogen, lower alkyl, aryl benzyl, phenethyl, phenylisopropyl, diphenylmethyl, cycloalkyl of 3 to 7 carbon atoms, cyclohexyl-methyl and cyclopentyl-ethyl.

5. The method of treating iron deficiency anemia in an animal which comprises administering to said animal an amount of 1,1'-diethyl-α,α'-epoxyferrocene equivalent to about 5 to about 500 mg. of elemental iron.

6. A unit dosage in the form of a tablet, capsule, a flavored pharmaceutically acceptable oil solution or a flavored aqueous sorbital suspension for oral administration in the treatment of iron deficiency anemia containing about 5 to 500 mg. of a compound of the formula:

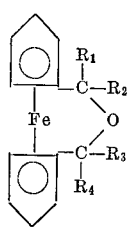

wherein $R_1$, $R_2$, $R_3$ and $R_4$ are selected from the group consisting of hydrogen, lower alkyl, benzyl, phenethyl, phenylisopropyl, diphenylmethyl, phenyl, cycloalkyl of 3 to 7 carbon atoms, cyclohexyl-methyl and cyclopentyl-ethyl and pharmaceutically acceptable salts thereof.

References Cited

UNITED STATES PATENTS 3,035,978   5/1962   Moss _____ 167—68

OTHER REFERENCES

Mashburn, T. A., et al., J. Org. Chem., 26 (1961), pages 1671–2.

ALBERT T. MEYERS, *Primary Examiner.*

SAM ROSEN, *Examiner.*

S. J. SINGER, S. J. FRIEDMAN, *Assistant Examiners.*